US011734229B2

(12) United States Patent
Manville et al.

(10) Patent No.: US 11,734,229 B2
(45) Date of Patent: **\*Aug. 22, 2023**

(54) REDUCING DATABASE FRAGMENTATION

(71) Applicant: EMC IP Holding Company LLC, Mountain View, CA (US)

(72) Inventors: Thomas Manville, Mountain View, CA (US); Julio Lopez, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/546,863

(22) Filed: Aug. 21, 2019

(65) Prior Publication Data

US 2019/0377711 A1 Dec. 12, 2019

Related U.S. Application Data

(63) Continuation of application No. 15/844,203, filed on Dec. 15, 2017, now Pat. No. 10,572,450, which is a continuation of application No. 14/675,454, filed on Mar. 31, 2015, now Pat. No. 9,875,249.

(51) Int. Cl.
*G06F 16/17* (2019.01)
*G06F 16/22* (2019.01)
*G06F 16/23* (2019.01)

(52) U.S. Cl.
CPC ...... *G06F 16/1724* (2019.01); *G06F 16/2282* (2019.01); *G06F 16/2365* (2019.01)

(58) Field of Classification Search
None
See application file for complete search history.

(56) References Cited

U.S. PATENT DOCUMENTS

| 5,864,342 | A | * | 1/1999 | Kajiya | G06T 11/001 |
| | | | | | 345/418 |
| 6,032,216 | A | * | 2/2000 | Schmuck | G06F 9/52 |
| | | | | | 710/200 |
| 6,112,210 | A | | 8/2000 | Nori | |

(Continued)

OTHER PUBLICATIONS

"Getting Started with the JDBC API: ResultSet", Sun Microsystems, published in 1999, retrieved on May 2, 2020, from https://www.cs.mun.ca/java-api-1.5/guide/jdbc/getstart/resultset.html#997826 (Year: 1999).

*Primary Examiner* — Wilson Lee
(74) *Attorney, Agent, or Firm* — Krishnendu Gupta; Nikhil Patel

(57) ABSTRACT

Techniques to reduce database fragmentation are disclosed. In various embodiments, an indication is received to store an attribute value for an entity that has a row or other entry in a first database table, wherein the first database table does not have a column for the attribute. It is determined that the value corresponds to a mapped value that is associated with not having an entry in a separate, second database table configured to store the attribute. Entries are made in the second database table only for values of the attribute other than the mapped value. Application level software code is configured to associate absence of a row in the second database table with the mapped value for the attribute.

21 Claims, 14 Drawing Sheets

(56) References Cited

U.S. PATENT DOCUMENTS

| | | | |
|---|---|---|---|
| 7,707,562 B1* | 4/2010 | Kaltenbach | G06F 8/443 |
| | | | 717/136 |
| 7,774,191 B2* | 8/2010 | Berkowitz | G06F 16/22 |
| | | | 703/23 |
| 7,912,842 B1* | 3/2011 | Bayliss | G06F 16/215 |
| | | | 707/749 |
| 8,705,108 B1* | 4/2014 | Hayakawa | G06F 3/1297 |
| | | | 358/1.15 |
| 9,875,249 B1* | 1/2018 | Manville | G06F 16/2365 |
| 10,572,450 B2* | 2/2020 | Manville | G06F 16/1724 |
| 10,841,405 B1* | 11/2020 | Lewis, III | G06F 16/2282 |
| 2002/0194149 A1* | 12/2002 | Gerber | G06F 16/284 |
| 2004/0004562 A1* | 1/2004 | Kita | H04N 7/52 |
| | | | 348/E5.009 |
| 2006/0136422 A1* | 6/2006 | Matveief | G06F 40/174 |
| 2007/0136551 A1* | 6/2007 | Leis | G06F 9/5077 |
| | | | 711/173 |
| 2007/0288495 A1 | 12/2007 | Narasayya | |
| 2008/0071818 A1* | 3/2008 | Apanowicz | H03M 7/30 |
| 2008/0194149 A1* | 8/2008 | Kim | H01R 27/02 |
| | | | 439/639 |
| 2008/0313213 A1 | 12/2008 | Zhang | |
| 2011/0307521 A1* | 12/2011 | Slezak | G06F 16/2453 |
| | | | 707/800 |
| 2012/0023064 A1* | 1/2012 | Ireland | H04L 67/1095 |
| | | | 707/610 |
| 2012/0096046 A1* | 4/2012 | Kucera | G06F 16/958 |
| | | | 707/802 |
| 2012/0330954 A1* | 12/2012 | Sivasubramanian | |
| | | | H04L 67/2804 |
| | | | 707/737 |
| 2013/0086569 A1* | 4/2013 | Chapman | G06F 9/45516 |
| | | | 717/158 |
| 2014/0019706 A1* | 1/2014 | Kanfi | G06F 16/122 |
| | | | 711/171 |
| 2014/0089017 A1* | 3/2014 | Klappert | G06Q 10/02 |
| | | | 705/5 |
| 2014/0172708 A1 | 6/2014 | Chrapko | |
| 2014/0214897 A1* | 7/2014 | Zhu | G06F 16/2455 |
| | | | 707/771 |
| 2014/0223094 A1 | 8/2014 | Baderdinni | |
| 2015/0055639 A1* | 2/2015 | Park | H04B 7/2612 |
| | | | 370/338 |
| 2015/0081577 A1* | 3/2015 | Khalil | G06Q 10/105 |
| | | | 705/320 |
| 2015/0347492 A1* | 12/2015 | Dickie | G06F 16/2365 |
| | | | 707/700 |
| 2016/0004733 A1* | 1/2016 | Cao | G06F 11/0709 |
| | | | 707/755 |
| 2016/0232207 A1* | 8/2016 | Brunel | G06F 16/24553 |

* cited by examiner

REDUCING DATABASE FRAGMENTATION

CROSS REFERENCE TO OTHER APPLICATIONS

This application is a continuation of U.S. patent application Ser. No. 15/844,203, entitled REDUCING DATABASE FRAGMENTATION filed Dec. 15, 2017 which is incorporated herein by reference for all purposes, which is a continuation of U.S. patent application Ser. No. 14/675,454, entitled REDUCING DATABASE FRAGMENTATION filed Mar. 31, 2015, now U.S. Pat. No. 9,875,249, which is incorporated herein by reference for all purposes.

BACKGROUND OF THE INVENTION

Relational databases (RDBMS), such as MySQL, are used to store data, typically in one or more tables. Each table typically has one or more rows, one row for each record, for example, and one or more columns, one column for each different attribute capable of being stored.

If a given row (record) does not have a value for a column, a "null" value may be indicated for that column if the table has been set up to support storing a "null" value with the column. A database system may be configured to store null values in a space and/or computationally efficient manner, which may for example require less storage space or other resources than storing an integer "0", a string, or any other non-null value.

For a sparsely populated table, or a table in which the same most common value is stored repeatedly for a given attribute, a single, large database table may use a lot of space to store data. In some database systems, data may be overwritten in place, i.e., in the same location(s) on storage media, resulting in unused space between database records as stored.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to reduce database fragmentation are disclosed. In various embodiments, a most common value for an attribute may be stored and/or overwritten by a "null" value. In some embodiments, a column in which previously stored most common value may have been overwritten with a "null" value, or in which a most common value may have been stored from the outset as a "null" value, the affected database table may be transformed by removing the affected column and storing the non-null (or other non-most common) data values only in a separate table.

Figure 1:
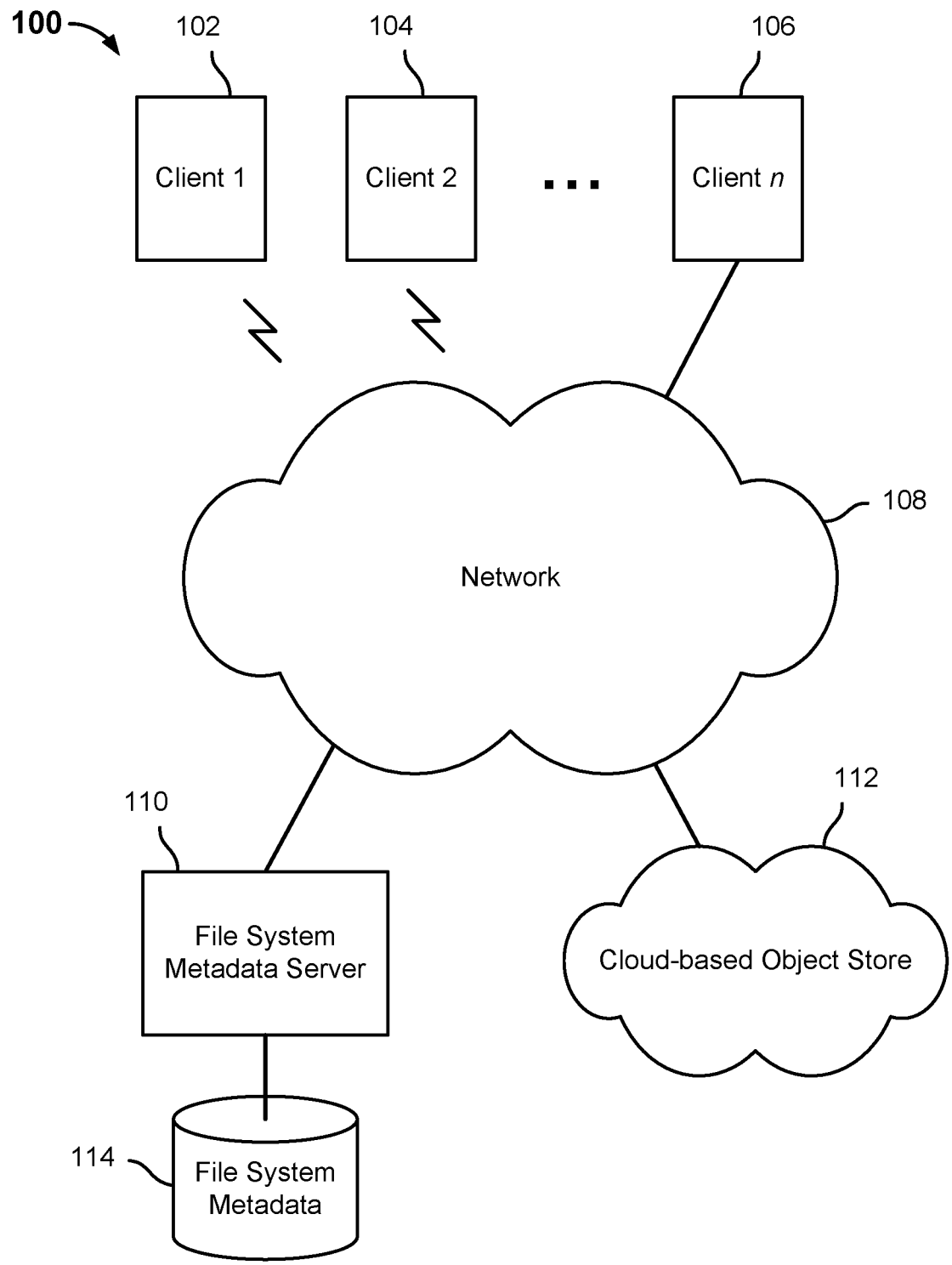
FIG. 1 is a block diagram illustrating an embodiment of a distributed file system and environment.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

Figure 2:
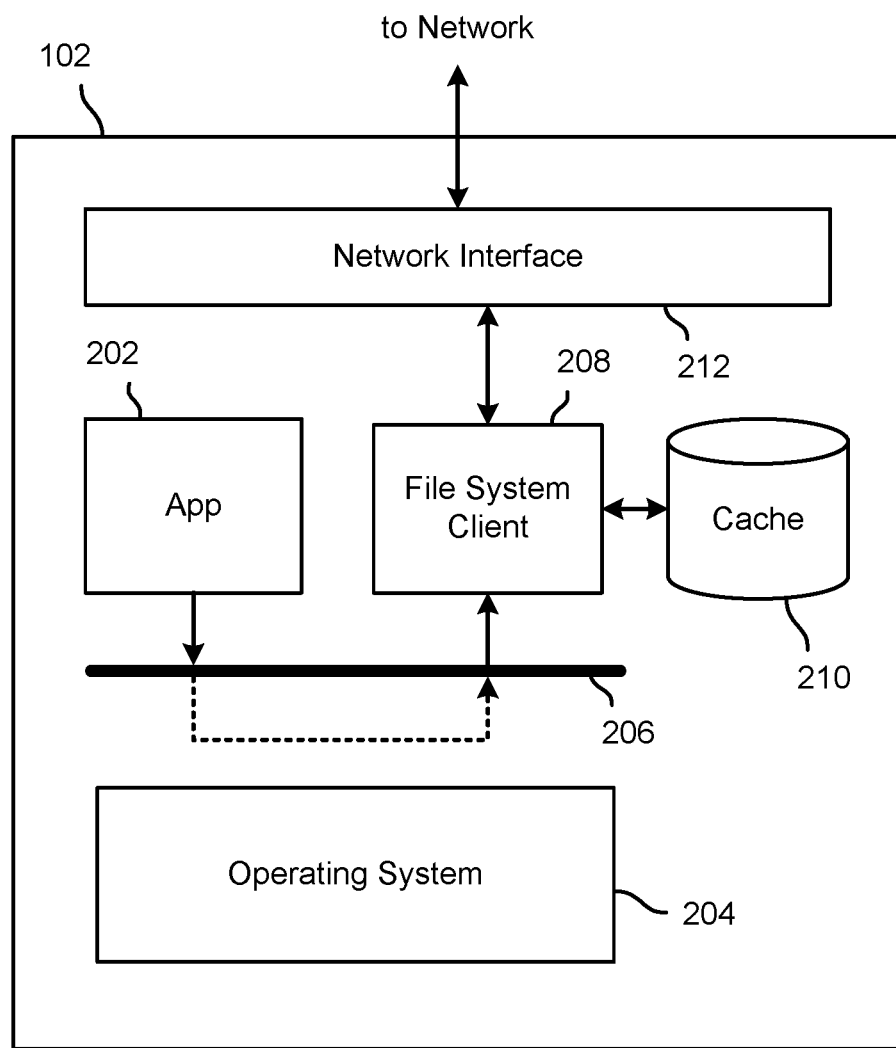
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
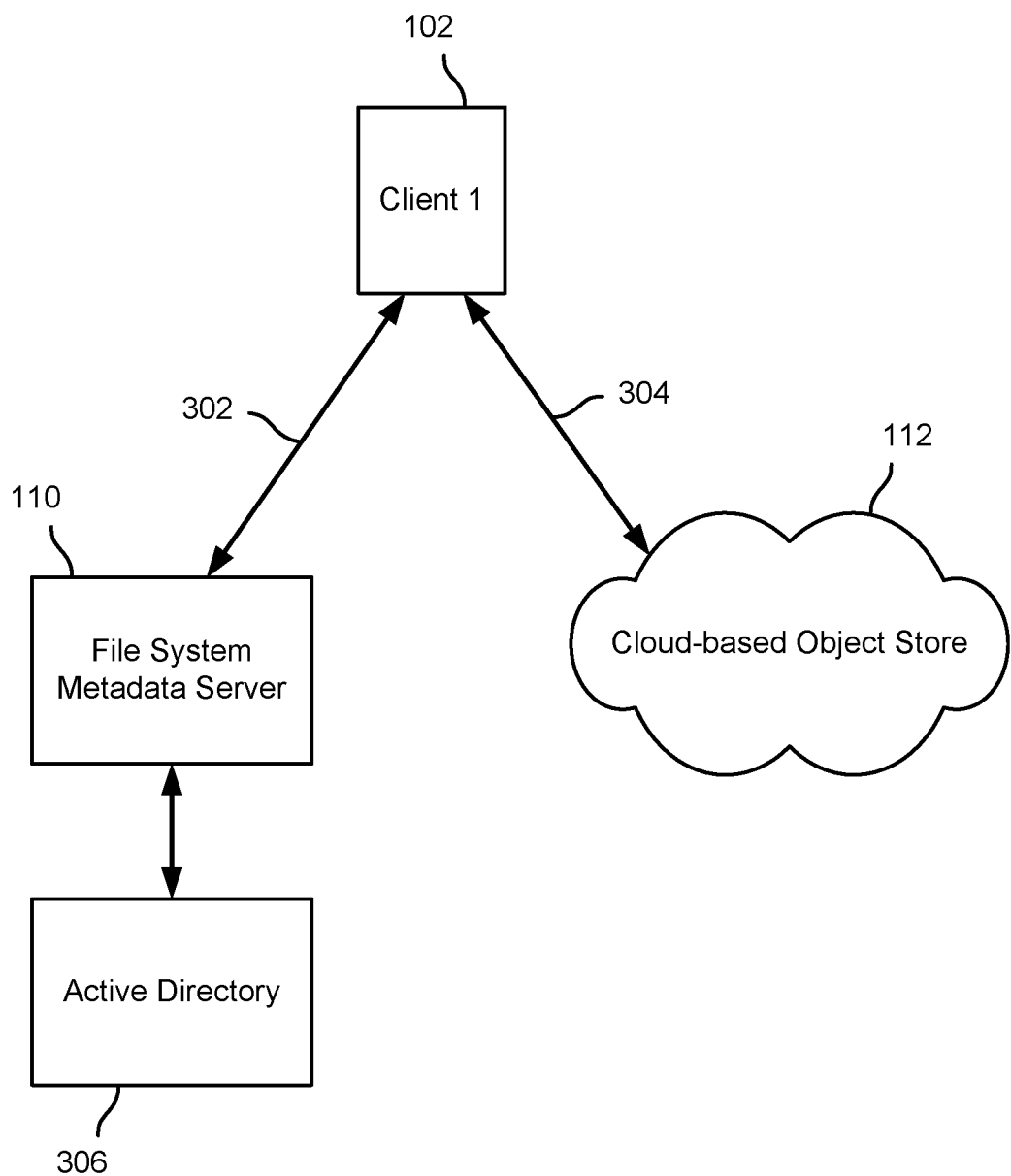
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
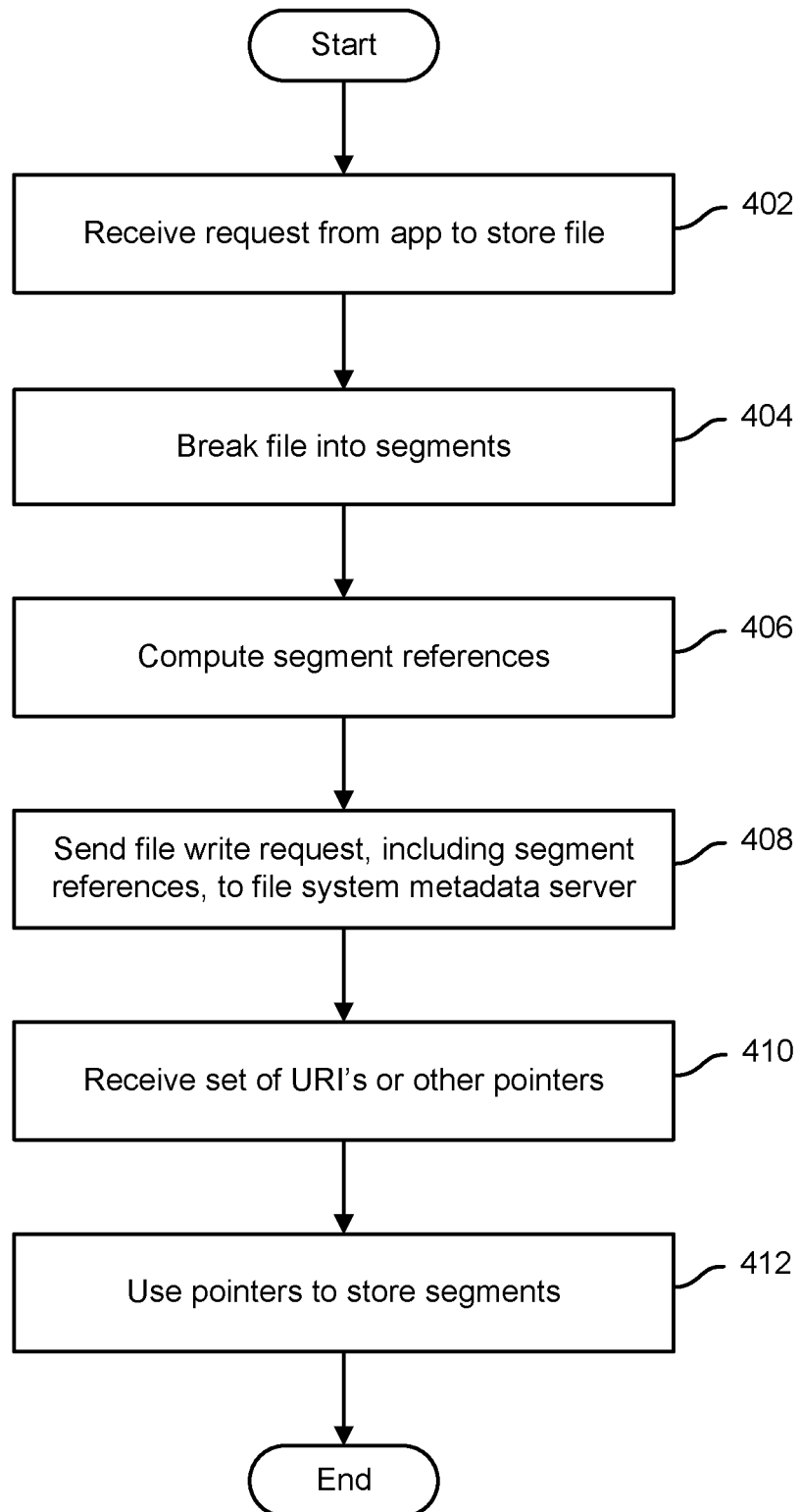
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
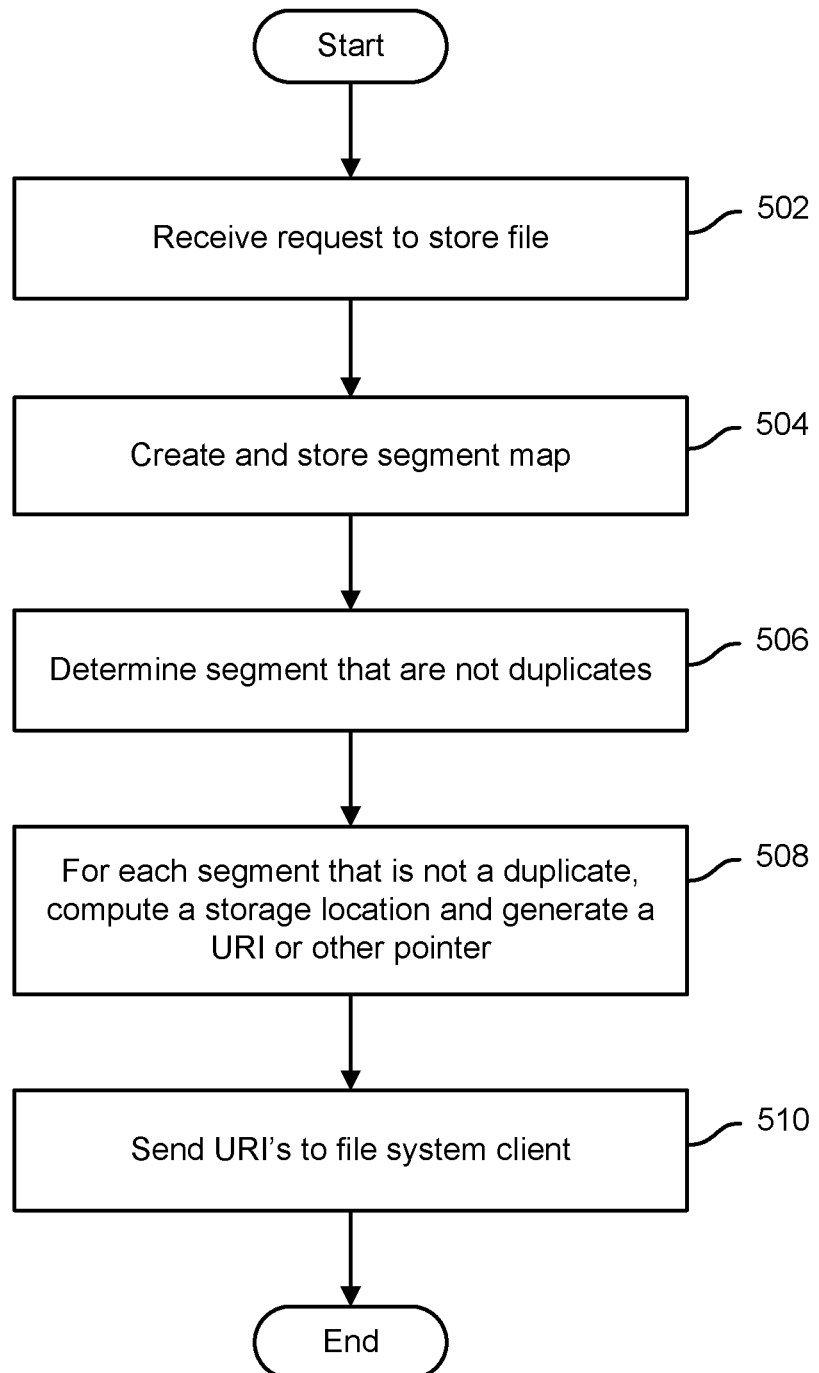
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
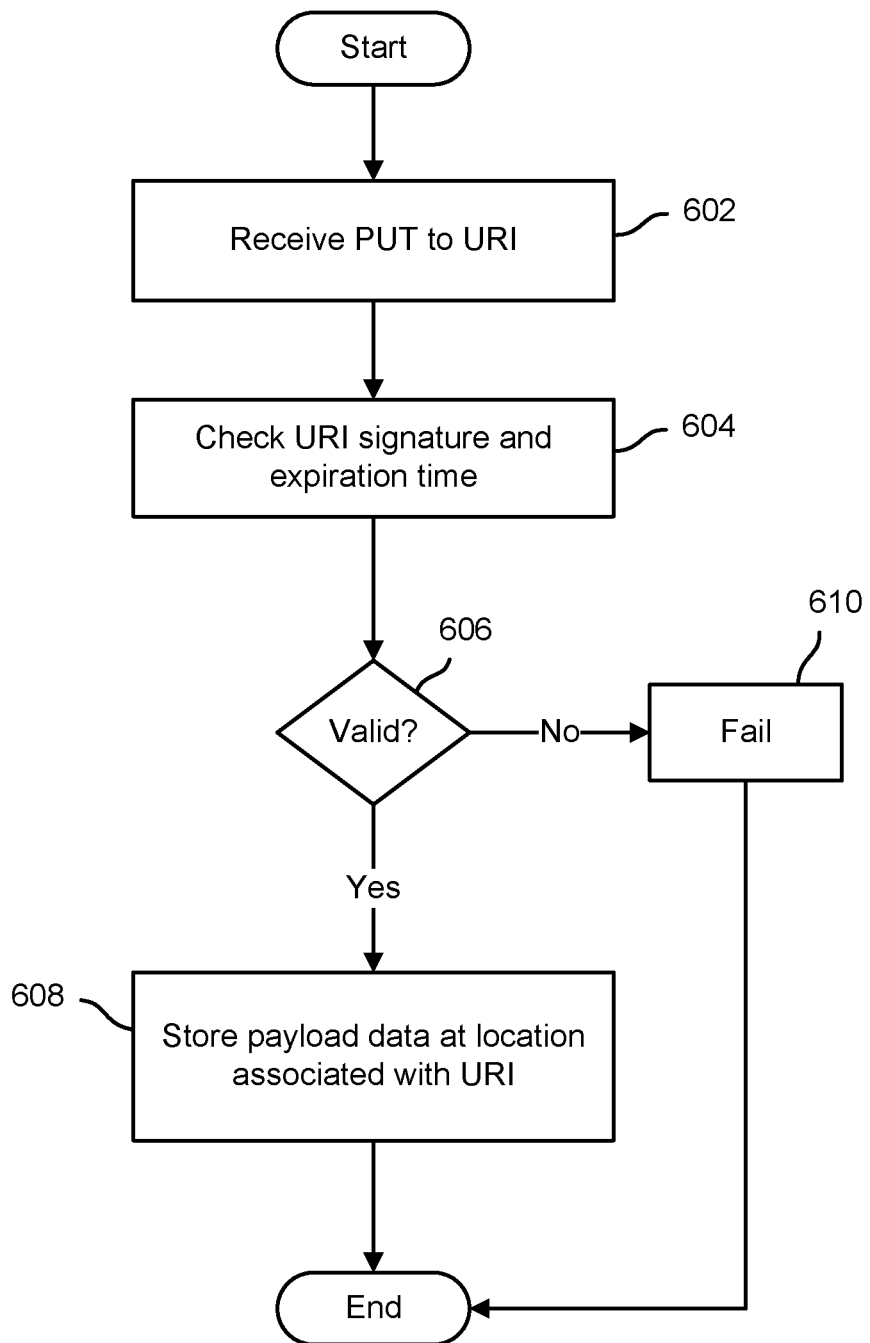
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
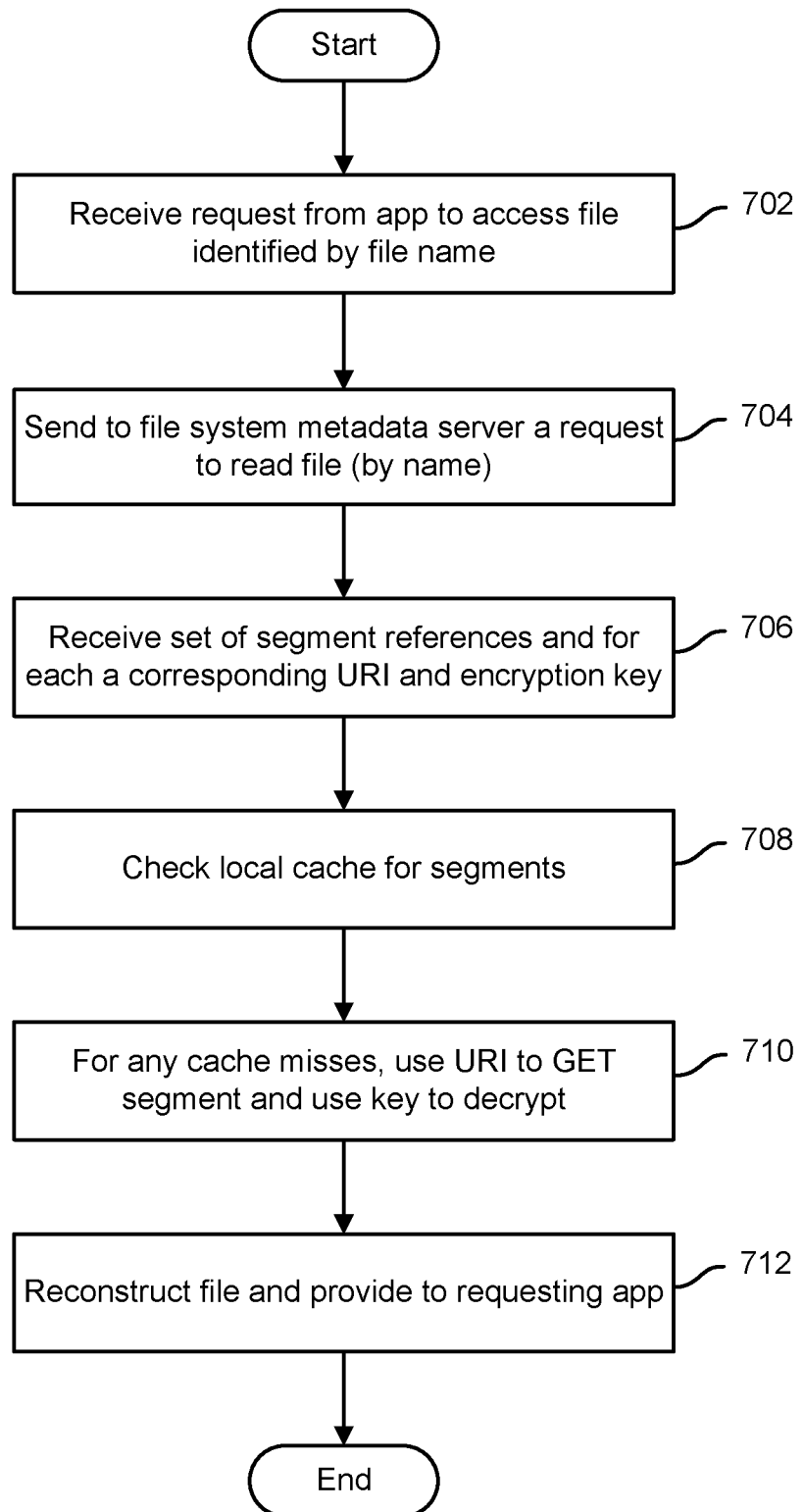
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
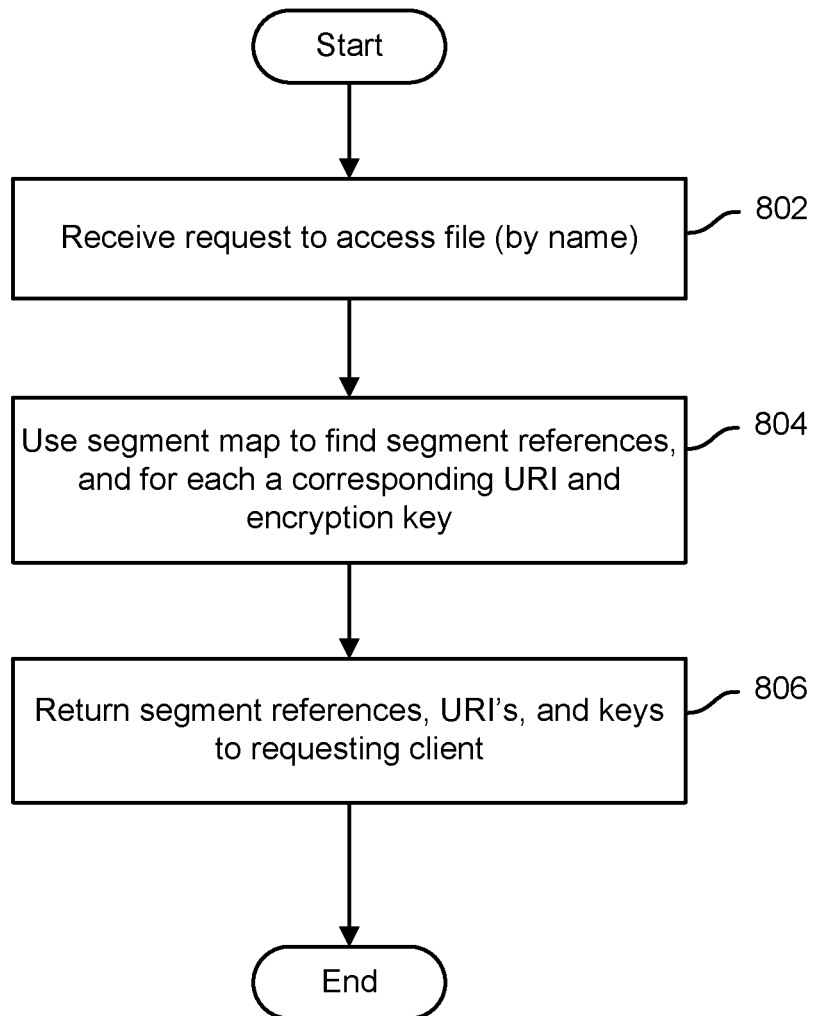
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

Figures 9A, 9B:
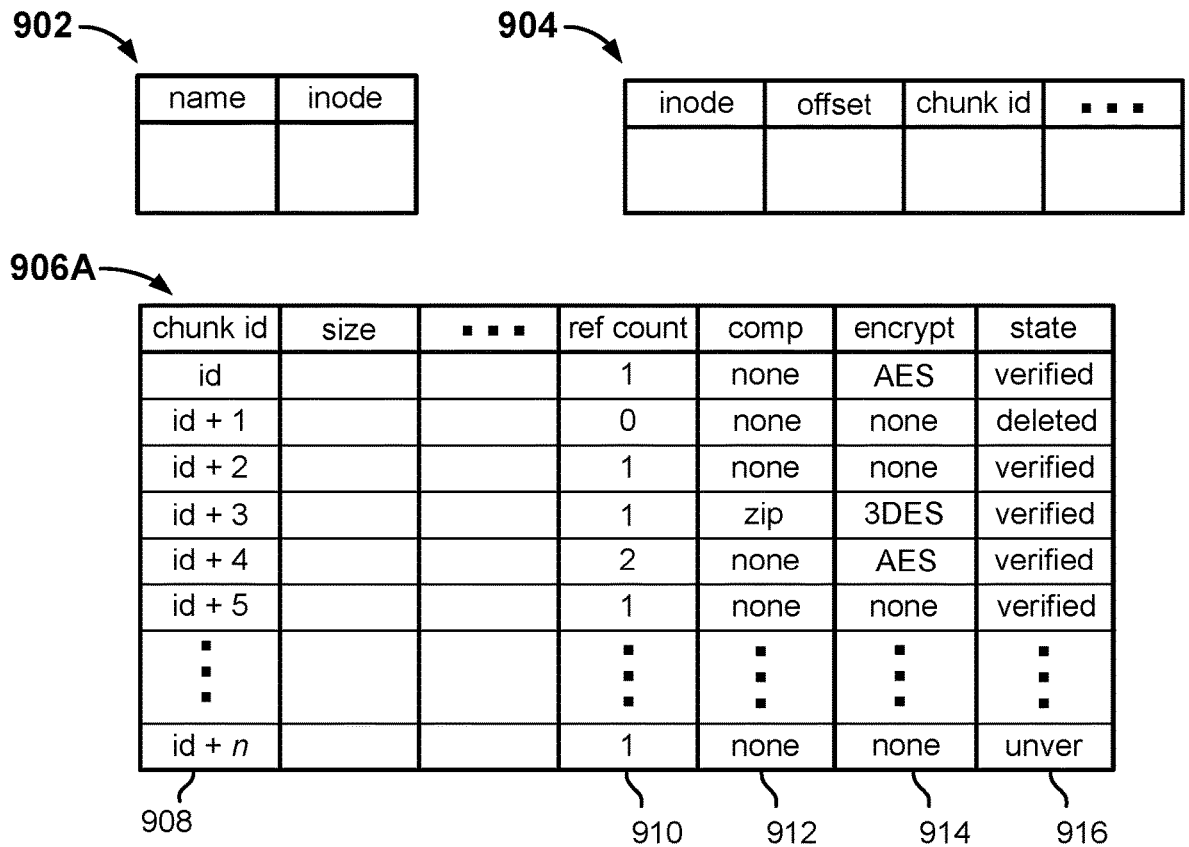
FIG. 9A is a block diagram illustrating an example set of file system metadata tables used in an embodiment of a distributed file system.
FIG. 9B is a block diagram illustrating an example of a file system metadata table in which a most common value for an attribute may be represented as a null value.

FIG. 9A is a block diagram illustrating an example set of file system metadata tables used in an embodiment of a distributed file system. In various embodiments, the tables 902, 904, and 906A of FIG. 9A may be created and maintained by a file system metadata server, such as file system metadata server 110 of FIGS. 1 and 3. In the example shown, an inode table 902 is used to store data associating each named file system object, e.g., directories, files, or other objects, with a corresponding inode or other unique number or identifier. Chunk map table 904 is used in various embodiments to store for each file, and for each of one or more segments (chunks) into which that file has been broken up to be stored, an offset of the chunk within the file, a chunk identifier (chunk id), and other metadata. For example, a file that has been stored as three chunks would have three entries (rows) in table 904, one for each chunk. In various embodiments, the chunk id is a monotonically increasing value, with each successively stored chunk being given a next chunk id in alphanumeric order. In various embodiments, chunks are immutable once stored. If file data is modified, affected data is stored as a new chunk and assigned a next chunk id in order. As a result, a chunk with a higher chunk id by definition was stored subsequent to a chunk with a lower chunk id, and it can be assumed neither was modified since it was created and stored.

Referring further to FIG. 9, the chunk metadata table 906 includes a row for each chunk, identified by chunk id (column 908 in the example shown), and for each chunk metadata indicating the size of the chunk; other metadata; a reference count (column 910) indicating how many currently live files (or other file system objects) reference the chunk; a compression method used, if any (column 912); an encryption method used, if any (column 914); and a state of the chunk, i.e., whether it has been verified or deleted (column 916).

Storing a most common (non-null) value for an attribute as a "null" value, e.g., in a database table, is disclosed. In various embodiments, a most common value for an attribute is determined. Application, database driver, and/or other code is configured to indicate a "null" value for the attribute, in place of the actual value, in the event that actual value is the most common value. In various embodiments, if the database returns a null value for the attribute, application level or other code maps the null value to the most common value.

FIG. 9B is a block diagram illustrating an example of a file system metadata table in which a most common value for an attribute may be represented as a null value. In the example shown in FIG. 9B, for each of a plurality of attributes (910, 912, 914, and 916) a most common value for that attribute is stored in chunk metadata table 906B as a "null" value. In the example shown, for example, the most common value for the reference count attribute, i.e., "1", has been overwritten with a null value, obviating the need to store the value "1" as an integer. Similarly, in the column labeled "comp" (912), the most common value "none", i.e., the chunk is not compressed as stored, has been overwritten with null values. In the example shown in FIG. 9B, "none" is the most common value for encryption type and has been overwritten with "null" values. In other system or instances, in which AES type encryption is used for almost all data, the value "AES" may be most common value and may be the value that is mapped to null. In either case, in various embodiments the most common value expected for and/or observed to be present in that particular instance of the chunk metadata table 906 may be mapped to "null". Finally, in this example, each chunk transitions through three states, as reflected in the "state" column (906): "unverified", "verified", and "deleted". In this example, a chunk is "unverified" only for a relatively short time when it is first stored, and then enters and remains in the "verified" state, possible for a relatively long time, unless/until it enters the "deleted" state (e.g., potentially for a relatively limited time, such as until it can be determined the chunk is no longer needed). As a result, in this example the most common state, "verified", has been mapped to null.

Figure 10:
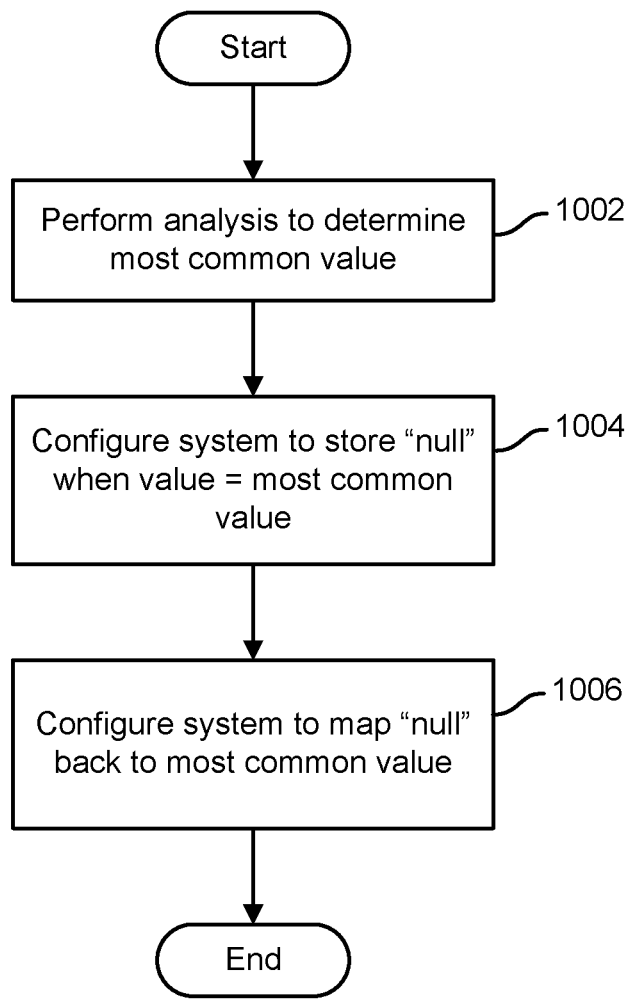
FIG. 10 is a flow chart illustrating an embodiment of a process to store a new file segment (chunk) metadata.

FIG. 10 is a flow chart illustrating an embodiment of a process to store a new file segment (chunk) metadata. In various embodiments, the process of FIG. 10 may be implemented by a file system metadata server, such as file system metadata server 110 of FIG. 1. In various embodiments, all or part of the process of FIG. 10 may be performed with respect to a chunk metadata table, such as chunk metadata table 906 of FIGS. 9A and 9B. In the example shown, an analysis is performed to determine a most common value for an attribute (1002). For example, a statistical analysis or other computer analysis may be performed. The system is configured to store or to cause the database to store a "null" value for instances in which the actual value for the attribute is equal to the most common value (1004). The system is configured to map a "null" value returned by the database for the attribute back to the most common value (1006).

For example, one database data type for which a "null" value may be stored is an enumerated or "ENUM" type. An ENUM type may have one of a defined number of integer values, each of which is associated with a corresponding data value, such as a string. For example, if there are two regions, EAST and WEST, then a data type ENUM may be defined, with 0=EAST and 1=WEST. Suppose, for example, that for a given table the value EAST was the most common value. In various embodiments, rather than store a value of "0" as an integer value over and over again, for instances (rows) for which the value of the attribute "Region" is "EAST" the application or other code would be configured to indicate a "null" value for that attribute. On reading a "null" value for the attribute Region, the application or other code would substitute the value "EAST", in this example.

Techniques to reduce database fragmentation are disclosed. In various embodiments, fragmentation may result when database values are overwritten in place by values that require less space to store than the value that was overwritten required. For example, in some embodiments, overwriting a most common (or other mapped value) with a "null" value may result in unused storage space between databased records as stored on media. In some embodiments, excessive space may be used to store the same most common value for a given attribute over and over again, whether represented as "null" or otherwise. In various embodiments, any change in row size can cause fragmentation. If a row size decreases, the modification can be done in place, but doing so will create a gap between the modified row and the next row as stored on storage media. If the row size increases and there is no room between the modified row and the next row, the row will need to be rewritten elsewhere, leaving a gap equal to the row's original size.

In various embodiments, a database table may be transformed to create a more efficient representation of the same set of data. In some embodiments, a database table that includes a column that contains non-null values for some rows and null values for other rows that are mapped at the application level to a most common or other mapped non-null value may be transformed by removing the column from the original table and storing a separate table only the non-null values from the original table/column.

Figure 11:
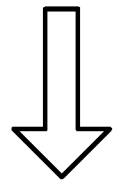
FIG. 11 is a block diagram illustrating an example of a database table transformation in an embodiment of a database system configured to store file system metadata.

FIG. 11 is a block diagram illustrating an example of a database table transformation in an embodiment of a database system configured to store file system metadata. In the example shown, chunk metadata table 906B of FIG. 9B, in which the most common values formerly stored in columns 910, 912, 914, and 916 have been overwritten by "null" values, is shown as being transformed to create a transformed chunk metadata table 1102, from which the overwritten columns have been removed. As shown in FIG. 11, for purposes of clarity only the "state" column 916 is shown and the "ref count", "comp", and "encrypt" columns 910, 912, and 914 are not shown. In the example shown, the "state" column 916 has been removed from the chunk metadata table 906B to create transformed chunk metadata table 1102, and in a separate "state" table 1104 the respective "state" values only for those records (rows) that were not in the "verified" state that had previously been overwritten with "null" are stored. In this example, the "null" values stored previously in chunk metadata table 906B for the "state" attribute for rows corresponding to the following chunk identifiers are not included the separate table generated in connection with the transformation disclosed herein: id, id+2, id+3, id+4, and id+5. In various embodiments, for each of the other columns removed from the chunk metadata table, a corresponding separate table specific to that attribute would be created (not shown in FIG. 11), and in each such table there would be a row only for those chunks that had a non-null (i.e., other than the most common) value for that attribute. In the example shown in FIG. 11, the transformed chunk metadata table 1102 includes all of the chunks in chunk id column 1108, but includes columns only for attributes that have not been separate out into separate, more compact separate tables, such as "state" table 1104. State table 1104 in this example includes in chunk id column 1112 and "state" column 1116 entries (rows) only for those chunks that had a non-null value as stored in chunk metadata table 906B.

Figure 12:
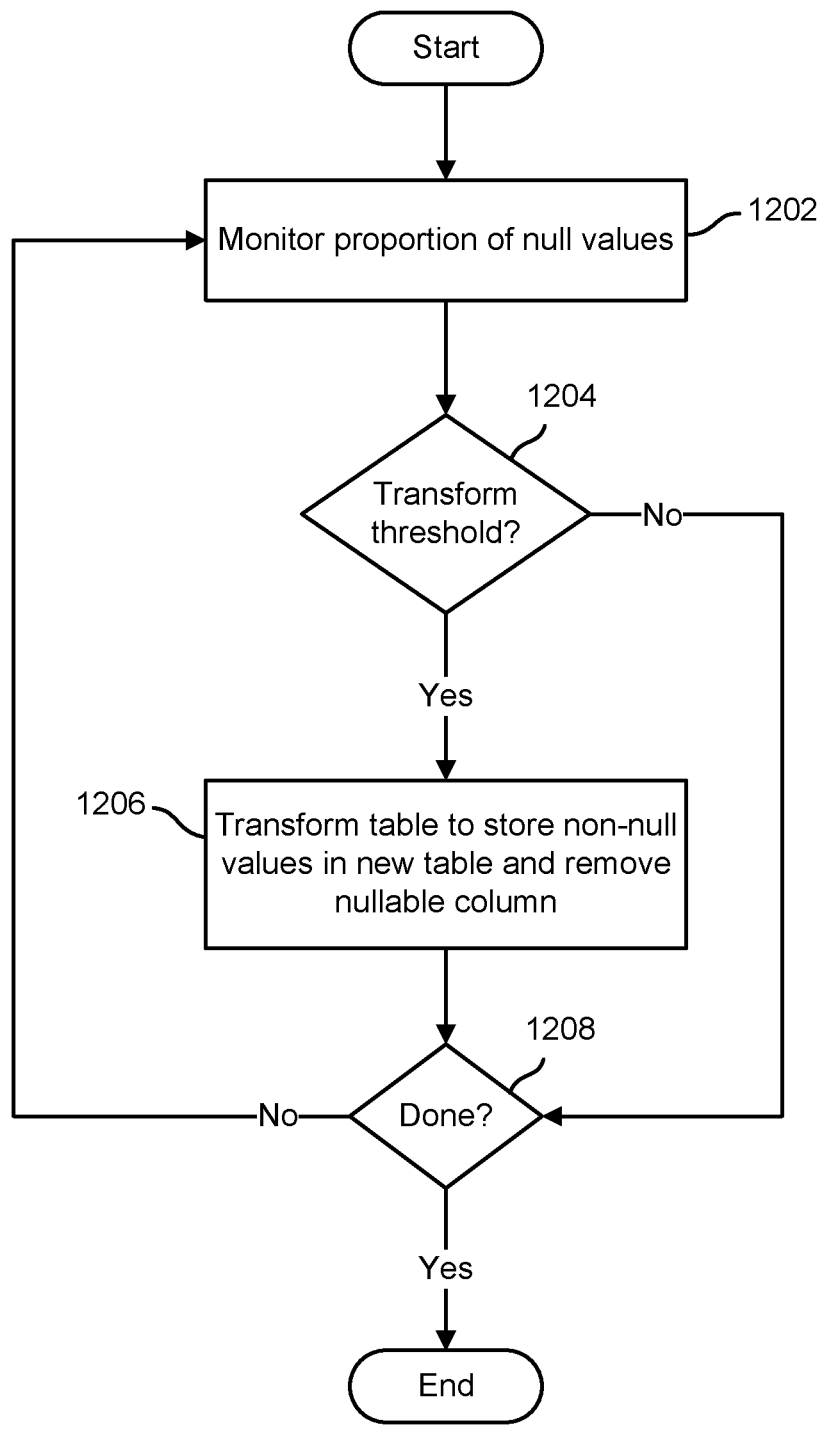
FIG. 12 is a flow chart illustrating an embodiment of a process to transform a database table to reduce fragmentation.

FIG. 12 is a flow chart illustrating an embodiment of a process to transform a database table to reduce fragmentation. In the example shown, a proportion of values in a given column that have been mapped to and/or overwritten with "null" values is monitored (1202). If a transform threshold is reached (1204), e.g., X % of rows have a "null" value for the column, the table is transformed to store just the non-null values in that column in a separate table (1206). If the threshold to transform has not been reach (1204), monitoring continues unless/until the threshold is reached or the process ends (1208).

In some embodiments, a table is not transformed as disclosed herein. Instead, a database table design time, if the most common or other mapped value for a given attribute is to be mapped to a "null" value, the database schema is set up at that time to omit the attribute from the main (e.g., chunk metadata) table and a separate table is set up to store only non-null values for the attribute. Values that would have been stored as null are handled in application level code by not storing an entry in the attribute specific table if the attribute otherwise would have been stored as a null value, and by configuring application code to interpret absence of a record in the separate table as indicating the "null" value and/or the most common or other value to which null previously had been or would have been mapped.

Figure 13:
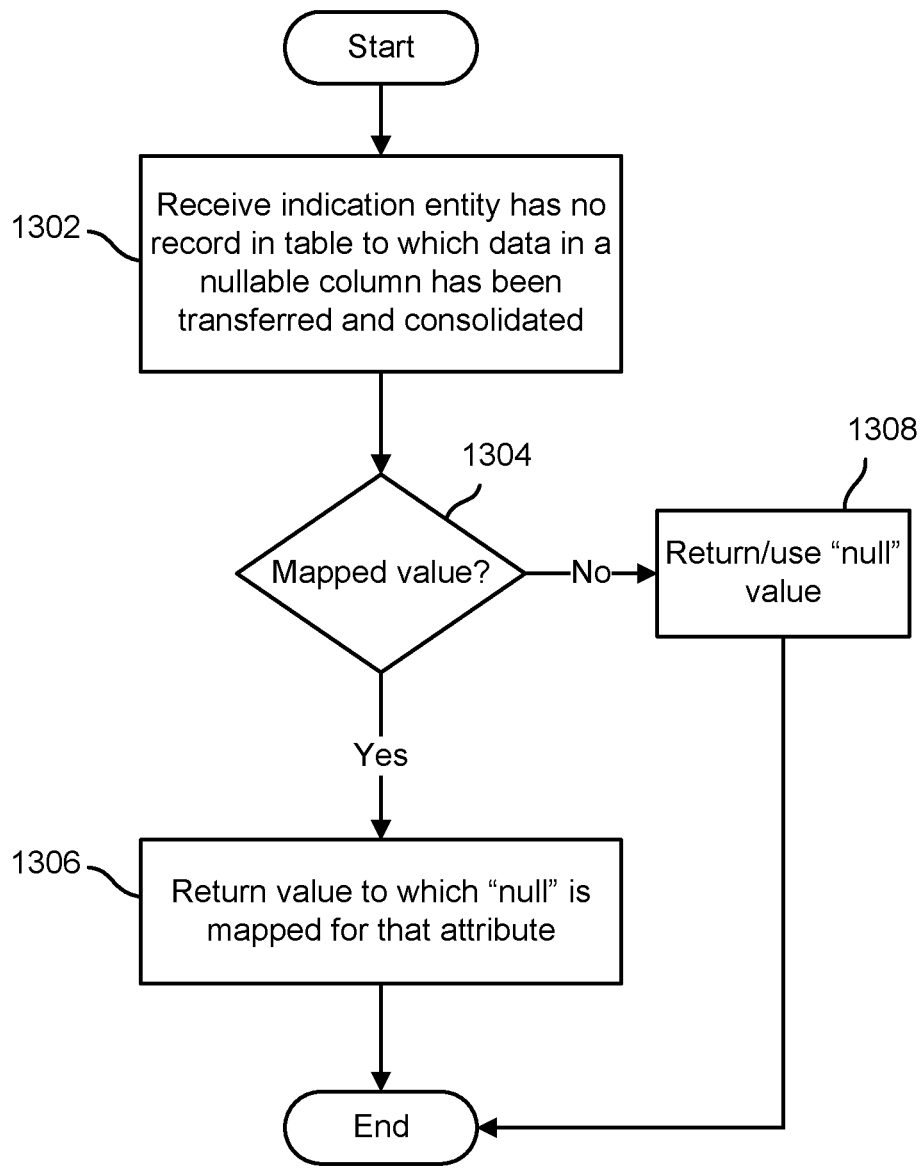
FIG. 13 is a flow chart illustrating an embodiment of a process to use a separate table into which only a subset of values that are non-null have been stored for an attribute.

FIG. 13 is a flow chart illustrating an embodiment of a process to use a separate table into which only a subset of values that are non-null have been stored for an attribute. In the example shown, an indication is received that a separate database table created to store for an attribute only those values that are non-null includes no row for an entity that is known to exist (1302). For example, a chunk that has a row in chunk metadata table 1102 of FIG. 11 would be known to exist, but would not necessarily have an entry in state table 1104 of FIG. 11. If the value stored in the separate table is one for which a "null" value or other result associated with the absence of a record in the separate table is mapped to some non-null value (1304), e.g., a most common value for the attribute, then the value that is mapped to "null" is returned for the attribute (1306). For example, in the case of the state table 1104 of FIG. 11, absence of an entry would be mapped to a state value of "verified". If the value is not a mapped value (1304), a null value is returned for the attribute (1308).

Figure 14:
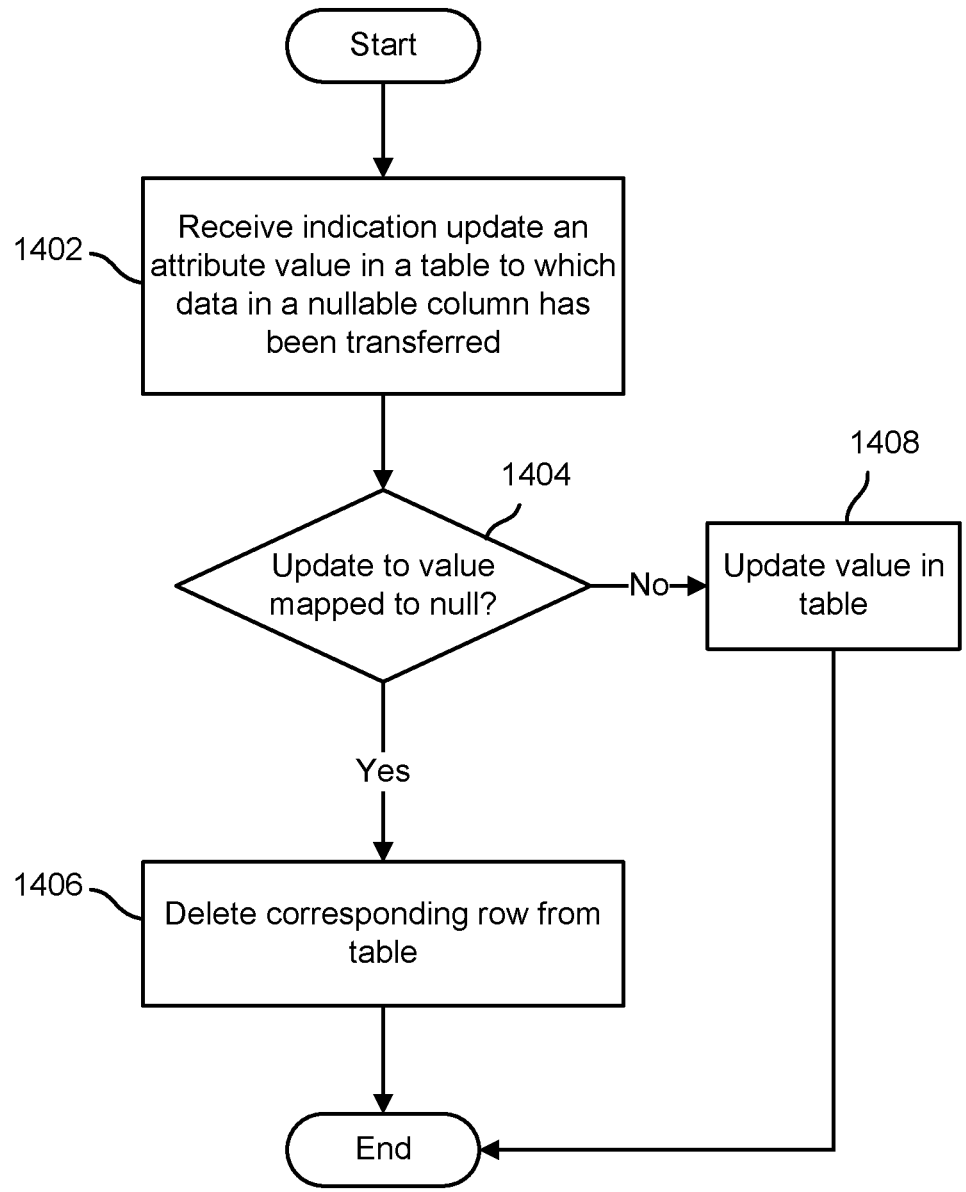
FIG. 14 is a flow chart illustrating an embodiment of a process to update or otherwise store a value for an attribute for which a separate table has been created to store only non-null values.

FIG. 14 is a flow chart illustrating an embodiment of a process to update or otherwise store a value for an attribute for which a separate table has been created to store only non-null values. An indication is received to update an instance of an attribute for which a separate table has been created to store only non-null values (1402). For example, an updated value for an instance of the attribute as stored in the separate table may be received. If the value indicated in the update is one that is to be mapped to a null value (1404), e.g., a most common value for the attribute, then the existing row in the separate table, which was created/modified previously to store a value other than the most common value and/or other value mapped to null, is deleted from the separate table (1406). For example, a row added to table 1104 of FIG. 11 to reflect the "unverified" state of a new chunk may be deleted, rather than updating the value to "verified", once the chunk has been verified. If the new value is not one that is mapped to null (1404), the existing entry is updated (or if needed a row added) to reflect the updated value in the separate table (1408).

Using techniques disclosed herein, file system metadata and/or other data may be stored more efficiently, in various embodiments, by storing in a separate table only those values for an attribute that are not the most common value or some other value mapped to and/or otherwise associated with a null value and/or absence of an entry in the separate table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
storing, by one or more processors, first information associated with a chunk in a first database table, wherein the chunk is associated with a file and the first information associated with the chunk comprises data associated with a first attribute, and the storing the first information comprises storing a null value in the first database table in place of a first attribute value, wherein the first attribute value is a non-null value;
mapping the first attribute to the null value in connection with storing the first attribute value in the first database table;
reducing fragmentation for storing the null value in place of the first attribute value in the first table, wherein reducing fragmentation includes transforming the first database table by removing affected portions of the first database table; and
storing, by one or more processors, the affected portions' non-null values and one or more values for the first attribute in one or more other database tables.

2. The method of claim 1, wherein the storing the one or more value for the first attribute in one or more other database tables reduces fragmentation associated with storing the null value in place of the first attribute value in the first database table.

3. The method of claim 1, wherein the first attribute value is mapped to the null value in connection with storing the first attribute value in the first database table.

4. The method of claim 1, wherein the one or more values for the first attribute that are stored in one or more other database tables correspond to values for the first attribute that are not mapped to the null.

5. The method of claim 1, further comprising:
determining, for the first attribute, a value that is to be mapped to null.

6. The method of claim 1, wherein entries made in the one or more other database tables are only for values of the first attribute that are different from the first attribute value that is mapped to the null value.

7. The method of claim 6, wherein application level software code is configured to determine that a value for a corresponding chunk is a mapped value for the first attribute based on a determination that a row in the third database table for the corresponding chunk does not exist.

8. The method of claim 1, further comprising:
receiving, by one or more processors, an indication to store second information associated with a corresponding chunk, wherein the second information associated with the corresponding chunk comprises data associated with a second attribute; and determining that the data associated with the second attribute corresponds to a value that is mapped to the null value.

9. The method of claim 1, further comprising: reducing the fragmentation associated with storing the null value in place of the first attribute value in the first database table, the reducing the fragmentation comprising forming a second database table, and wherein the second database table does not have a column for the first attribute at least in part as a result of a transformation of the first database table.

10. The method of claim 9, wherein the forming of the second database table comprises transforming the first database table by removing from the first database table a former column configured to store the data associated with the first attribute, and a third database table is created and configured to store only those values in the former column that were not mapped to the null value.

11. The method of claim 1, wherein application level software code is configured to associate the null value for the first attribute with the mapped value.

12. The method of claim 1, wherein the first attribute value corresponds to a most common value for the attribute.

13. The method of claim 1, further comprising receiving an indication to update a row in at least one of the one or more other database tables, determining that an updated attribute value comprising the update is associated with a mapping to the null value, and deleting the row from the at least one of the one or more other database tables based at least in part on the determination.

14. A system, comprising:
one or more processors configured to:
store first information associated with a chunk in a first database table, wherein the chunk is associated with a file and the first information associated with the chunk comprises data associated with a first attribute, and the storing the first information comprises storing a null value in the first database table in place of a first attribute value, wherein the first attribute value is a non-null value;
map the first attribute to the null value in connection with storing the first attribute value in the first database table;
reduce fragmentation for storing the null value in place of the first attribute value in the first table, wherein reducing fragmentation includes transforming the first database table by removing affected portions of the first database table; and
store the affected portions' non-null values and one or more values for the first attribute in one or more other database tables.

15. The system of claim 14, wherein the storing the one or more value for the first attribute in one or more other database tables reduces fragmentation associated with storing the null value in place of the first attribute value in the first database table.

16. The system of claim 14, wherein the first attribute value is mapped to the null value in connection with storing the first attribute value in the first database table.

17. The system of claim 14, wherein the one or more processors are further configured to determine, for the first attribute, a value that is to be mapped to null.

18. The system of claim 14, wherein the reducing the fragmentation comprises forming a second database table, and wherein the second database table does not have a column for the first attribute at least in part as a result of a transformation of the first database table.

19. The system of claim 14, wherein the first attribute value corresponds to a most common value for the attribute.

20. The system of claim 14, wherein the one or more processors is further configured to receive an indication to update a row in at least one of the one or more other database tables, determine that an updated attribute value comprising the update is associated with a mapping to the null value, and delete the row from the at least one of the one or more other database tables based at least in part on the determination.

21. A computer program product to store data, the computer program product being embodied in a non-transitory computer readable storage medium and comprising computer instructions for:
storing, by one or more processors, first information associated with a chunk in a first database table, wherein the chunk is associated with a file and the first information associated with the chunk comprises data associated with a first attribute, and the storing the first information comprises storing a null value in the first database table in place of a first attribute value, wherein the first attribute value is a non-null value;
mapping the first attribute to the null value in connection with storing the first attribute value in the first database table;
reducing fragmentation for storing the null value in place of the first attribute value in the first table, wherein reducing fragmentation includes transforming the first database table by removing affected portions of the first database table; and
storing, by one or more processors, the affected portions' non-null values and one or more values for the first attribute in one or more other database tables.

* * * * *